W. J. CLOW.
WATER PURIFYING APPARATUS.
APPLICATION FILED APR. 15, 1913.
1,122,688.  Patented Dec. 29, 1914.
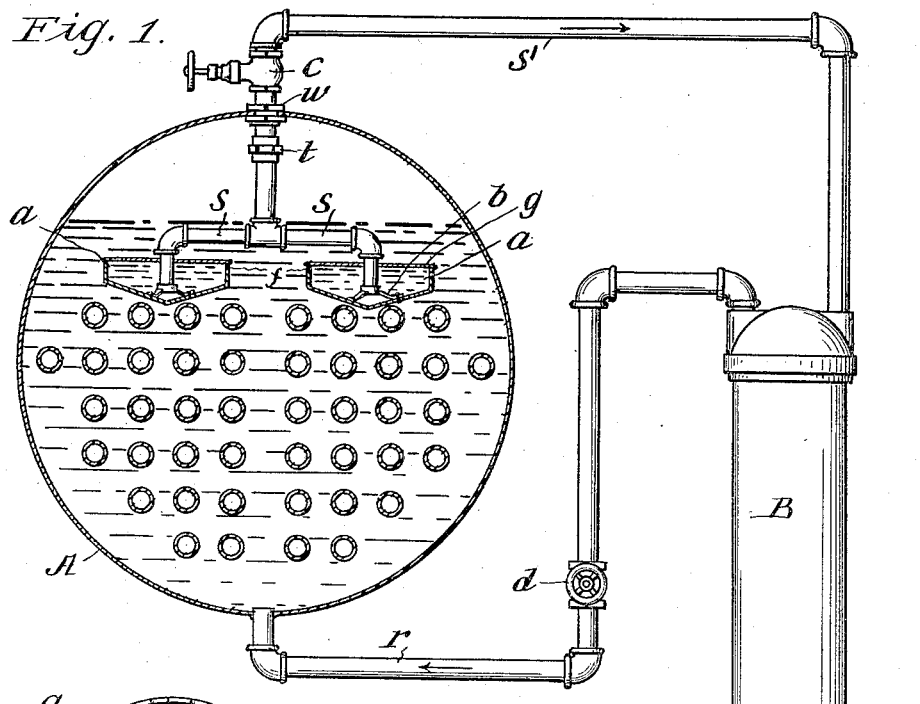
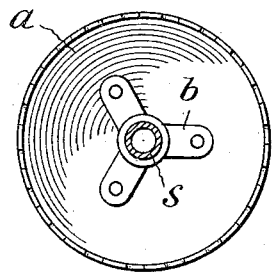
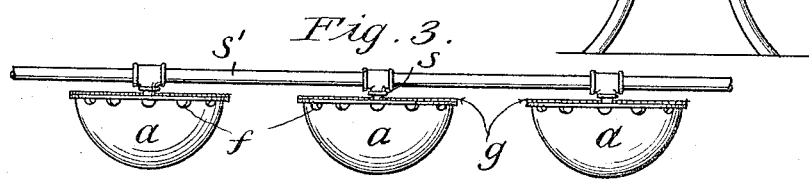
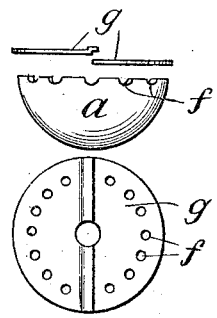
WITNESSES:
INVENTOR:
William J. Clow,
BY
F. G. Fischer,
ATTORNEY.

UNITED STATES PATENT OFFICE.

WILLIAM J. CLOW, OF INDEPENDENCE, MISSOURI.

WATER-PURIFYING APPARATUS.

1,122,688. Specification of Letters Patent. Patented Dec. 29, 1914.

Application filed April 15, 1913. Serial No. 761,337.

*To all whom it may concern:*

Be it known that I, WILLIAM J. CLOW, a citizen of the United States, residing in Independence, in the county of Jackson and State of Missouri, have invented a new and useful Water-Purifying Apparatus, of which the following is a specification.

My invention relates to improvements in water purifying apparatus for steam boilers in which the impurities are separated from the water through the agency of heat and gravity; and one object of the invention is to secure the greatest possible degree of purification at a minimum expenditure of heat.

A further object is to produce an apparatus which is automatic, or substantially so, in its action, and simple, durable, and inexpensive to manufacture.

With the above and other objects in view the invention may be said to consist in the construction, combination, and arrangement of parts hereinafter described, and specifically pointed out in the claims, and in order that said invention may be fully understood, reference will now be made to the accompanying drawing, in which:

Figure 1 is a cross sectional view of a steam boiler with the preferred form of my apparatus applied thereto. Fig. 2 is a plan view of a settling-vessel forming an important feature of the invention, the lid of said vessel being removed. Fig. 3 is a side elevation of a series of settling-vessels communicating with a common outlet pipe. Fig. 4 is a detail side elevation of one of the settling-vessels and its lid, the latter about to be placed upon the former. Fig. 5 is a plan view of one of the settling-vessels.

A designates a tubular boiler within which are suspended a plurality of settling-vessels $a\ a$, by means of spiders $b\ b$, secured to the lower ends of eduction pipes $s\ s$. The eduction pipes $s\ s$ are arranged in oppositely-disposed pairs and communicate with a common outlet pipe $s'$, which extends through a bushing $w$ secured to the top of the boiler.

The outlet pipe $s'$ has a union $t$, and a valve $c$, which latter controls the flow of water through said outlet pipe.

The discharge end of the outlet pipe $s'$ communicates with the dome of a sediment tank B, of any ordinary or preferred type capable of efficiently separating impurities discharged therein with the water from pipe $s'$. The sediment tank B is provided at its conical bottom portion with a drain pipe C having a valve E which is opened whenever it becomes necessary to relieve the tank of all or part of the impurities collected therein.

A return pipe $r$ leading from the dome of the sediment tank B to the bottom of the boiler A, is provided to carry the purified water from said tank back into the boiler. The return pipe $r$ is provided with a valve $d$ to control the flow of water therethrough.

The settling vessels $a$ may be made in various sizes and shapes, the important point being to have the central points of the bottom portions depressed to concentrate the impurities in the water at the mouths of the eduction pipes $s$, so that said impurities will readily enter said pipes. In the drawing I have shown the settling vessels in two different forms, that disclosed by Fig. 1, being V-shaped in cross-section, and the one disclosed by the remaining figures, being substantially semispherical. The upper margins of the settling-vessels have perforations or apertures $f$, and their upper open ends are closed by lids $g$, each preferably, made in two pieces, so that it can be removed from around the eduction pipe which it embraces when in position on its respective settling-vessel. When desired the lid $g$ may be perforated as shown on Fig. 5, instead of the bottom of the settling-vessel.

In practice, the circulation of the water in the boiler tends to carry all impurities in suspension even after such impurities become disassociated from the water through the application of heat to the boiler, and it is necessary to bring the water to a quiescent state in order that the impurities may be precipitated through the force of gravity. This quiescent state of the water is accomplished as it enters the apertures $f$ and flows slowly through the settling-vessels $a$, which protects the water therein from agitation by the outside currents. Consequently the impurities being heavier than the water sink to the bottom of the vessels and become concentrated at the mouths of the eduction pipes $s\ s$, through which they flow to the outlet pipe $s'$ with a certain proportion of the water, and are collected in the sediment tank B, the purified water then returning to the boiler A through the pipe $r$. The foregoing action is automatic and continuous, but when only the most simple type of apparatus is desired, the tank B and its pipe connections with the boiler are dispensed with and the sediment is collected in the settling-vessels $a$, which may be cleansed from time to time as required on removing the lids, or if desired, the eduction pipes $s$ and outlet pipe $s'$ may be retained and the impurities blown-off therethrough.

The settling-vessels $a$ have demonstrated by actual practice that they will perform their function of eliminating the impurities from the water equally as well, or better, when submerged as when located near the surface of the water, and consequently they should not be confused with the usual skimmers which are capable of removing only the light impurities which float upon the surface of the water. By submerging the settling-vessels $a$, as shown and described, they collect not only the light impurities, but also heavy particles of scale and other foreign matter which ordinary skimmers would not reach.

The invention is equally adaptable to stationary boilers, steam tractors, and locomotives.

Having thus described my invention, what I claim and desire to secure by Letters Patent is:

1. In a water purifying apparatus of the character described, a settling-vessel depressed at its central bottom portion and having perforated sides, an eduction pipe leading from said settling-vessel at a point adjacent the depressed bottom, a spider connecting the settling-vessel to said eduction pipe, and a removable lid embracing the eduction pipe and resting upon the vessel.

2. In a water purifying apparatus for steam boilers, a settling-vessel having a depressed bottom, and a removable perforated lid to close the top of said settling-vessel.

3. In a water purifying apparatus of the character described, a settling-vessel depressed at its central bottom portion, an eduction pipe leading from said settling-vessel at a point adjacent the depressed bottom, and a spider connecting the settling-vessel to said eduction pipe.

4. In a water purifying apparatus of the character described, a settling vessel adapted to be submerged and having a bottom portion converging downwardly from all directions, and an eduction pipe communicating with the lowermost part of said bottom portion, substantially as shown and described.

WILLIAM J. CLOW.

Witnesses:
MARK S. WHITE,
R. L. GOOLD.